United States Patent
Jang et al.

(10) Patent No.: US 9,237,190 B2
(45) Date of Patent: Jan. 12, 2016

(54) NODE AND METHOD FOR GENERATING SHORTENED NAME ROBUST AGAINST CHANGE IN HIERARCHICAL NAME IN CONTENT-CENTRIC NETWORK (CCN)

(71) Applicant: Samsung Electronics Co., Ltd., Suwon-si (KR)

(72) Inventors: Myeong Wuk Jang, Hwaseong-si (KR); Jae Hoon Kim, Yongin-si (KR); Do Jun Byun, Seoul (KR); Byoung Joon Lee, Seongnam-si (KR); Seong Ik Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 253 days.

(21) Appl. No.: 13/860,971

(22) Filed: Apr. 11, 2013

(65) Prior Publication Data

US 2013/0282854 A1 Oct. 24, 2013

(30) Foreign Application Priority Data

Apr. 18, 2012 (KR) .................. 10-2012-0040056

(51) Int. Cl.
*H04L 29/08* (2006.01)
*G06F 15/167* (2006.01)
*H04L 29/12* (2006.01)

(52) U.S. Cl.
CPC .............. *H04L 67/10* (2013.01); *G06F 15/167* (2013.01); *H04L 67/2842* (2013.01); *H04L 61/303* (2013.01); *H04L 67/327* (2013.01)

(58) Field of Classification Search
CPC .......................... H04L 61/303; H04L 61/1552
See application file for complete search history.

(56) References Cited

U.S. PATENT DOCUMENTS

| 7,277,885 | B2 * | 10/2007 | Eppley et al. ........................ 1/1 |
| 8,661,329 | B1 * | 2/2014 | Teper .................. G06F 17/5045 715/211 |
| 8,972,453 | B2 * | 3/2015 | Wu et al. ....................... 707/797 |
| 9,013,990 | B2 * | 4/2015 | Lee ....................... H04L 47/127 370/231 |
| 2004/0088306 | A1 * | 5/2004 | Murthy et al. ................ 707/100 |
| 2009/0287835 | A1 | 11/2009 | Jacobson |
| 2009/0288163 | A1 | 11/2009 | Jacobson et al. |
| 2010/0195653 | A1 | 8/2010 | Jacobson et al. |

(Continued)

OTHER PUBLICATIONS

Jacobson, Van. "Introduction to Content Centric Networking" FISS 09, Bremen, Germany. XP55069234. Jun. 22, 2009 (96 pages, in English).

(Continued)

*Primary Examiner* — Lashonda Jacobs
(74) *Attorney, Agent, or Firm* — NSIP Law

(57) ABSTRACT

A node and a method for generating a shortened name robust against a change in a hierarchical name in a Content-Centric Network (CCN) are provided. The method includes receiving a packet requesting content including a hierarchical name of the content, and determining whether a prefix of the hierarchical name is identical to a name of the node. The method further includes generating a shortened name by removing the prefix from the hierarchical name if the prefix is identical to the name component, and changing the hierarchical name to the shortened name. The shortened name is used to check whether the corresponding content is stored in the content cache, to check whether the same content-request packet is already under processing, and to decide an outgoing face to which the content-request packet is transmitted.

19 Claims, 10 Drawing Sheets

(56) References Cited

U.S. PATENT DOCUMENTS

| | | | |
|---|---|---|---|
| 2010/0195654 A1 | 8/2010 | Jacobson et al. | |
| 2010/0195655 A1* | 8/2010 | Jacobson | H04L 45/748 370/392 |
| 2011/0090908 A1 | 4/2011 | Jacobson et al. | |
| 2011/0179040 A1* | 7/2011 | Bessonov et al. | 707/747 |
| 2012/0317525 A1* | 12/2012 | Chapman | 716/102 |
| 2013/0039249 A1* | 2/2013 | Ravindran et al. | 370/312 |
| 2013/0198351 A1* | 8/2013 | Widjaja et al. | 709/223 |
| 2013/0282854 A1* | 10/2013 | Jang | H04L 67/10 709/213 |
| 2013/0282860 A1* | 10/2013 | Zhang et al. | 709/217 |
| 2014/0129736 A1* | 5/2014 | Yu | 709/242 |
| 2014/0233575 A1* | 8/2014 | Xie et al. | 370/400 |

OTHER PUBLICATIONS

"CCNx Protocol", CCNx.org. Retrieved from the Internet: URL: http://www.ccnx.org/releases/latest/doc/technical/CCNxProtocol.html [retrieved on Oct. 10, 2013]. XP055069230. Mar. 2, 2012 (5 pages, in English).

Extended European Search Report issued Jul. 10, 2013 in counterpart European Application No. 13164121.9 (5 pages, in English).

* cited by examiner

NODE AND METHOD FOR GENERATING SHORTENED NAME ROBUST AGAINST CHANGE IN HIERARCHICAL NAME IN CONTENT-CENTRIC NETWORK (CCN)

CROSS-REFERENCE TO RELATED APPLICATION(S)

This application claims the benefit under 35 U.S.C. §119 (a) of Korean Patent Application No. 10-2012-0040056, filed on Apr. 18, 2012, in the Korean Intellectual Property Office, the entire disclosure of which is incorporated herein by reference for all purposes.

BACKGROUND

1. Field

The following description relates to a node and a method for generating a shortened name robust against a change in a hierarchical name in a Content-Centric Network (CCN).

2. Description of Related Art

In a name-based network, a content-request packet, namely an interest, includes a hierarchical name of content desired to be fetched. For example, nodes included in the name-based network may receive a content-request packet, and may transfer the received content-request packet to an interface in a direction in which a node with content corresponding to a content name included in the content-request packet is located. The node with the content may search for the content based on the content name, and may transfer the content to an interface through which the content-request packet enters, so that the content may be transferred to a node that requests the content. Additionally, the nodes included in the name-based network may receive a content-response packet in response to the content-request packet.

However, when a name of a node that generates or has content, or a name of a group (or domain) which the node belongs to, is changed, it may be difficult to access the content with an original name of the content or a changed name of the content.

SUMMARY

In one general aspect, there is provided a method of a node included in a content-centric network (CCN) based on a hierarchical name structure, the method including receiving a content-request packet including a hierarchical name of the content, and determining whether a prefix of the hierarchical name is identical to a name of the node. The method further includes generating a shortened name by removing the prefix from the hierarchical name if the prefix is identical to the name component, and changing the hierarchical name to the shortened name.

In another general aspect, there is provided a node included in a content-centric network (CCN) based on a hierarchical name structure, the node including a receiving unit configured to receive a content-request packet including a hierarchical name of the content, and a first determining unit configured to determine whether a prefix of the hierarchical name is identical to a name of the node. The node further includes a generating unit configured to generate a shortened name by removing the prefix from the hierarchical name if the prefix is identical to the name component, and a changing unit configured to change the hierarchical name to the shortened name.

Other features and aspects will be apparent from the following detailed description, the drawings, and the claims.

Figure 1:
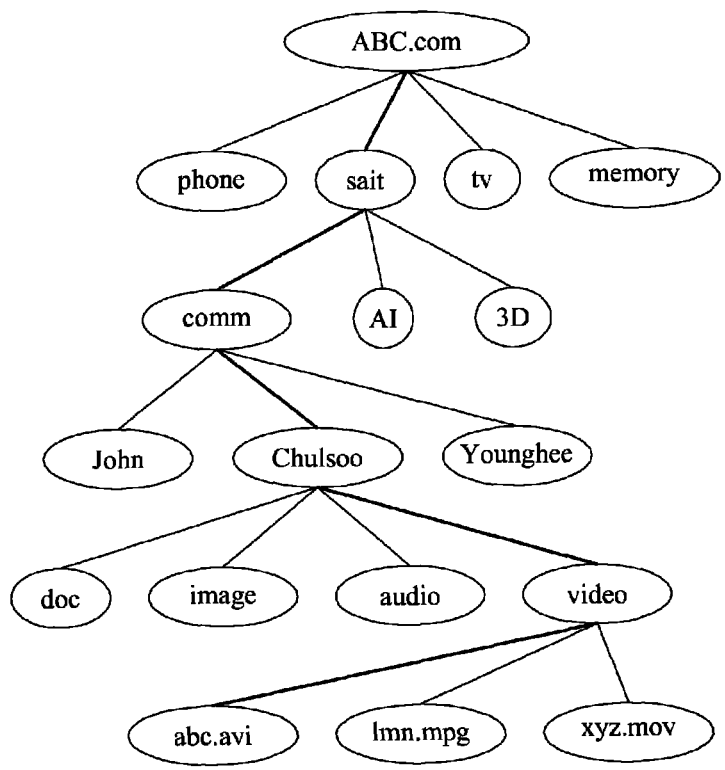
FIG. 1 is a diagram illustrating an example of a hierarchical name structure formed based on a relationship between virtual groups included in a Content-Centric Network (CCN), and an example of a hierarchical name of content based on the hierarchical name structure, and a classification of the hierarchical name.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates an example of a hierarchical name structure formed based on a relationship between virtual groups included in a Content-Centric Network (CCN), and an example a hierarchical name of content based on the hierarchical name structure, and a classification of the hierarchical name. A content name used for communication in a CCN based on a hierarchical name of content may include a plurality of name components, for example '/ABC.com/sait/comm/Chulsoo/video/abc.avi/v7/s3', based on the hierarchical name structure of FIG. 1.

Name components in a hierarchical name of content may be classified into four classes based on meanings of the name components. A first class may refer to a node, or a set of nodes, for example '/ABC.com/sait/comm/Chulsoo', and a second class may refer to a position in which content is stored in a node, for example '/video'. Additionally, a third class may refer to a service name or a file name of content, for example '/abc.avi', and a fourth class may refer to version information and/or a segment number of content, for example '/v7/s3'.

However, interpretation of classes for each name component may vary depending on a node, despite the same hierarchical names of content. In an example, a node A may classify '/ABC.com/sait/comm/Chulsoo' and '/video' may into the first class and the second class, respectively. In another example, a node B may classify '/ABC.com' and '/sait/comm/Chulsoo/video' into the first class and the second class, respectively.

Additionally, a hierarchical name of content may include a different form for each CCN, or for each name-based network. For example, in addition to the above classes of the name components, a class of a new name component may be added (e.g., an instruction, a parameter, a hash value, and/or other classes known to one of ordinary skill in the art), or a portion of the classes may be omitted.

Furthermore, in a hierarchical name of content, classifiers other than '/', for example '.', may be used, and a class of a name component indicating a node or a set of nodes may be located in an end portion, instead of a beginning portion, of the hierarchical name. A hierarchical name of content is merely an example, and various types of changeable hierarchical names may be used.

Figure 2:
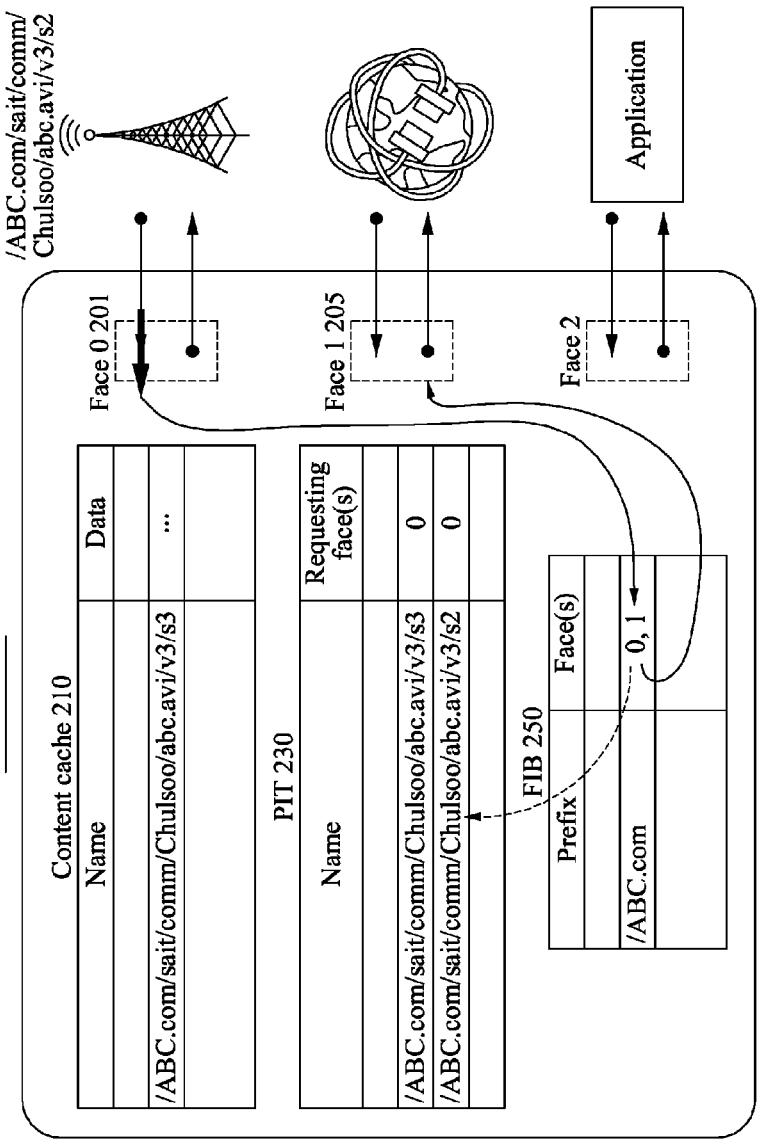
FIG. 2 is a diagram illustrating an example of a method of processing a content-request packet in a CCN.

FIG. 2 illustrates an example of a method of processing a content-request packet in a CCN. In the CCN, a name of content functions as a compass to search for a node in which the content is stored, and functions to distinguish the content from another content. Accordingly, each content includes its own name.

When names of two contents are different from each other, the two contents are determined to be different contents, despite the same information being included in the two contents. For example, when two files include different names, namely '/ABC.com/sait/video/intro.avi' and '/ABC.com/sait/comm/video/intro.avi', the two files are processed as different contents, even though the two files include the same information. The above rule may be very useful in distinguishing different contents with similar names.

FIG. 2 illustrates the method of processing a content-request packet in the CCN or a name-based network, i.e., a method of fetching content based on a hierarchical name of the content. Referring to FIG. 2, a node 200 included in the CCN includes a face 0 201, a face 1 205, a face 2 connected to an application, a content cache 210, a Pending Interest Table (PIT) 230, and a Forwarding Information Base (FIB) 250. The term 'face' is used interchangeably with an 'interface'.

The node 200 receives, via the face 0 201 from, e.g., another node included in the CCN, a content-request packet that requests content corresponding to a hierarchical name of the content, for example, '/ABC.com/sait/comm/Chulsoo/abc.avi/v3/s2'. The hierarchical name of the content is included in the content-request packet.

A networking module of the node 200 determines whether the requested content (i.e., data) is included in the content cache 210 based on the hierarchical name of the content '/ABC.com/sait/comm/Chulsoo/abc.avi/v3/s2'. When the content is determined to be stored in the content cache 210, the node 200 returns the content to the face 0 201 used to receive the content-request packet. When the content is determined not to be stored in the content cache 210, the node 200 determines whether an entry including the hierarchical name '/ABC.com/sait/comm /Chulsoo/abc.avi/v3/s2' is included in the PIT 230.

When the entry is determined to be included in the PIT 230, the node 200 adds information on the requesting face 0 201 to the entry in the PIT 230. When the entry is determined not to be included in the PIT 230, the node 200 searches for the entry by performing a lookup based on the hierarchical name of the content in the FIB 250. In this example, the node 200 searches for the entry based on longest-prefix-matching (e.g., '/ABC.com') a prefix of the hierarchical name with information on a prefix registered in an entry of the FIB 250.

The node 200 selects the face 1 205 based on information on faces that is registered in the searched entry of the FIB 250. The node 200 transmits, via the selected face 1 205 to, e.g., another node included in the CCN, the content-request packet.

In this example, the node 200 registers, in the PIT 230, the information '0' on the requesting face 0 201, so that a data packet including the content corresponding to the content-request packet may be enabled to be transferred via the requesting face 0 201 to another node requesting the content. Additionally, when the node 200 selects one of faces based on the FIB 250, the node 200 excludes the requesting path from the face candidates to avoid a loop of the content-request packet.

The above method works in general, but when a prefix portion of a hierarchal name of content is changed, a node requesting the content may not access the content. In an example, when a portion of a hierarchical name of content is changed and a content-request packet includes an original name of content, it may be difficult for a node to transfer the content-request packet to another node that possesses the content, due to inconsistency between the changed hierarchical name prefix included in the FIB 250 and the name prefix of the original name. In another example, when a portion of a hierarchical name of content is changed and a content-request packet includes the changed name of content, a node may transfer the content-request packet to another node that possesses the content. However, in this example, since the other node internally uses a content name written during generation of the content, the corresponding content may not be found inside the node.

Figure 3:
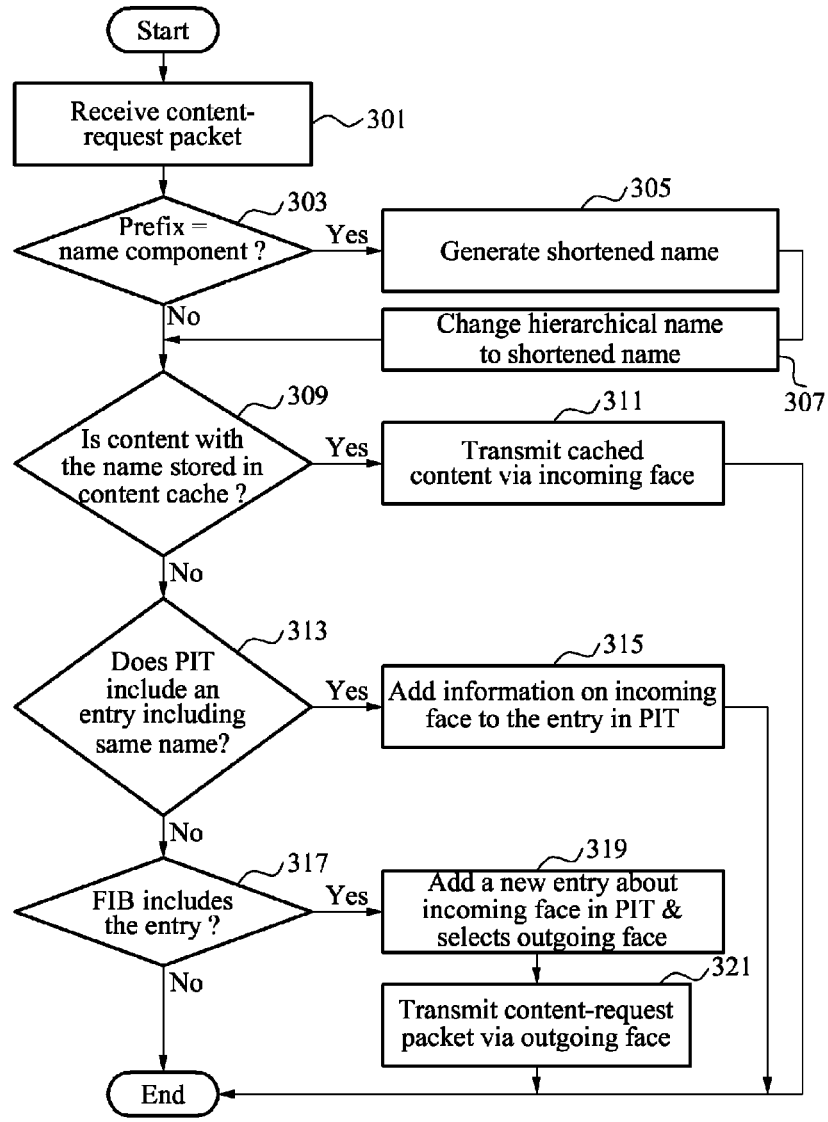
FIG. 3 is a flowchart illustrating an example of a method of processing a content-request packet in a node included in a CCN.

FIG. 3 illustrates an example of a method of processing a content-request packet in a node included in a CCN. Referring to FIG. 3, in operation 301, a node, or a networking module of the node, receives a content-request packet requesting content and including a hierarchical name of the content via a face of the node from, e.g., another node included in the CCN.

In operation 303, the node determines whether a prefix of the hierarchical name of the content is identical to a name component corresponding to the node. If the prefix is determined to be identical to the name component, the method continues in operation 305. Otherwise, the method continues in operation 309.

In this example, interpretation of classes for each name component may vary depending on a node, despite the same hierarchical names of content. For example, in a hierarchical name of content 'ABC.com/sait/comm/Chulsoo/video/abc.avi', either 'ABC.com/sait/comm/Chulsoo' or 'ABC.com/sait' may be determined to be a first class. In other words, a prefix of the hierarchical name may be classified into different classes.

In operation 305, the node generates a shortened name by removing the matched prefix from the hierarchical name of the content.

In operation 307, the node changes the hierarchical name of the content to the shortened name. This shortened name is used to search matched entries in content cache, PIT, and FIB, because content caches, PIT and FIB in the proposed architecture use shortened names and/or name prefixes.

In operation 309, the node verifies whether the content with the same shortened name is stored in the content cache. If the content is verified to be stored in the content cache, the method continues in operation 311. Otherwise, the method continues in operation 313.

In operation 311, the node transmits the cached content via the face (i.e., an incoming face) to the other node that requests the content.

In operation 313, the node determines whether the PIT includes an entry including the same hierarchical name of the content, e.g., the shortened name. If the PIT is determined to include the entry, the method continues in operation 315. Otherwise, the method continues in operation 317.

In operation 315, the node adds information on the incoming face to the entry in the PIT.

In operation 317, the node determines whether the FIB includes an entry based on the same hierarchical name of the content, e.g., the shortened name. The node may determine whether the FIB includes the entry based on longest-prefix-matching the prefix of the hierarchical name with information on a prefix registered in an entry of the FIB 250. If the FIB is determined to include the entry, the method continues in operation 319. Otherwise, the method ends.

In operation 319, the node adds a new entry about incoming face in PIT and selects an outgoing face based on information on faces that is registered in the entry of the FIB 250.

In operation 321, the node transmits the content-request packet via the outgoing face to, e.g., another node included in the CCN.

Figure 4:
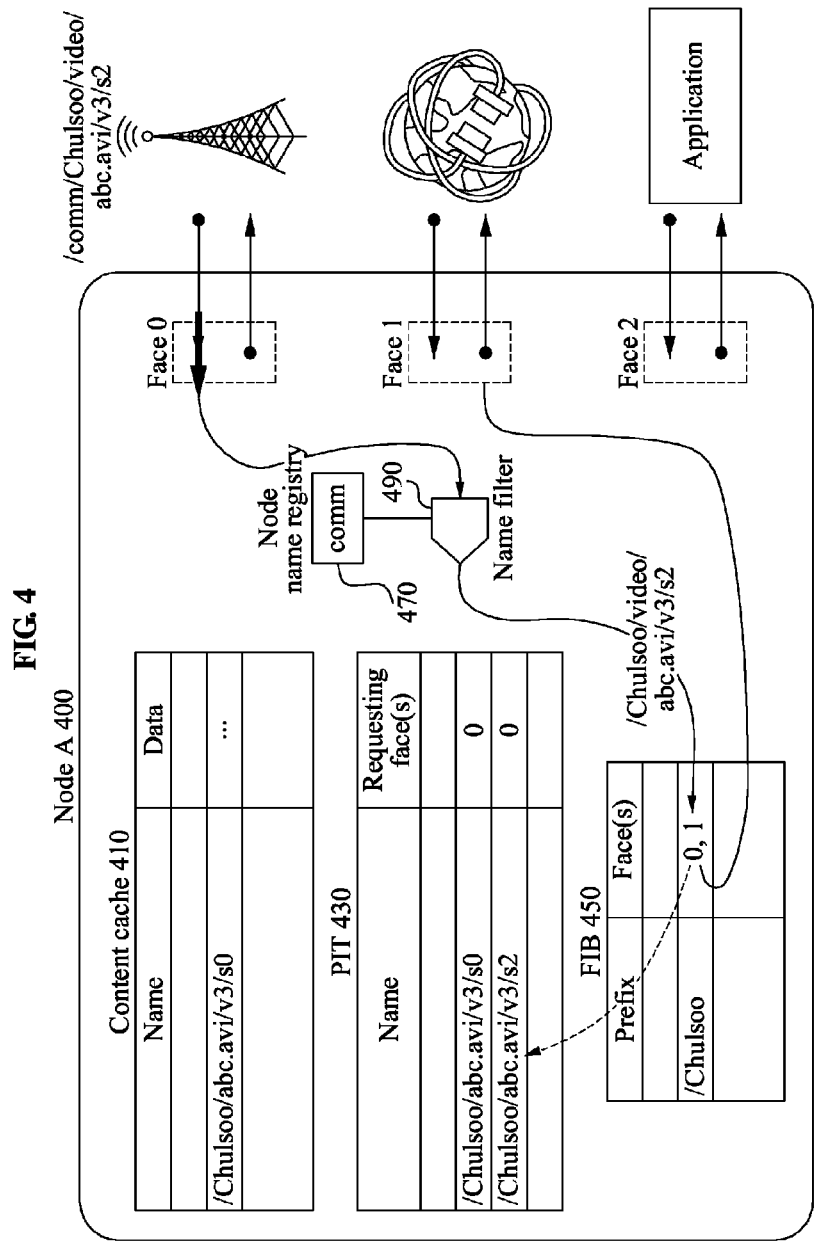
FIG. 4 is a diagram illustrating another example of a method of processing a content-request packet in a CCN.

FIG. 4 illustrates another example of a method of processing a content-request packet in a CCN. Referring to FIG. 4, a node A 400 included in the CCN that corresponds to a name component 'c&n' includes a face 0, a face 1, a face 2 connected to an application, a content cache 410, a PIT 430, and a FIB 450. The node A 400 further includes a node name registry 470 and a name filter 490.

The node A 400 receives, from, e.g., another node included in the CCN, a content-request packet including a hierarchical name of content that is started from '/comm' (e.g., '/comm/Chulsoo/video/abc.avi/v3/s2').

The node name registry 470 stores the name component 'comm' The node A 400 determines whether a prefix (e.g., 'comm') of the hierarchical name of the content is identical to the name component 'comm' If the prefix is determined to be identical to the name component 'comm', the name filter 490 removes the prefix from the hierarchical name to generate a shortened name (e.g., 'Chulsoo/video/abc.avi/v3/s2').

The node A 400 may compare the shortened name with hierarchical names of content that are stored in the content cache 410, the PIT 430 and/or the FIB 450 in a similar manner as described with respect to FIG. 2.

Figure 5:
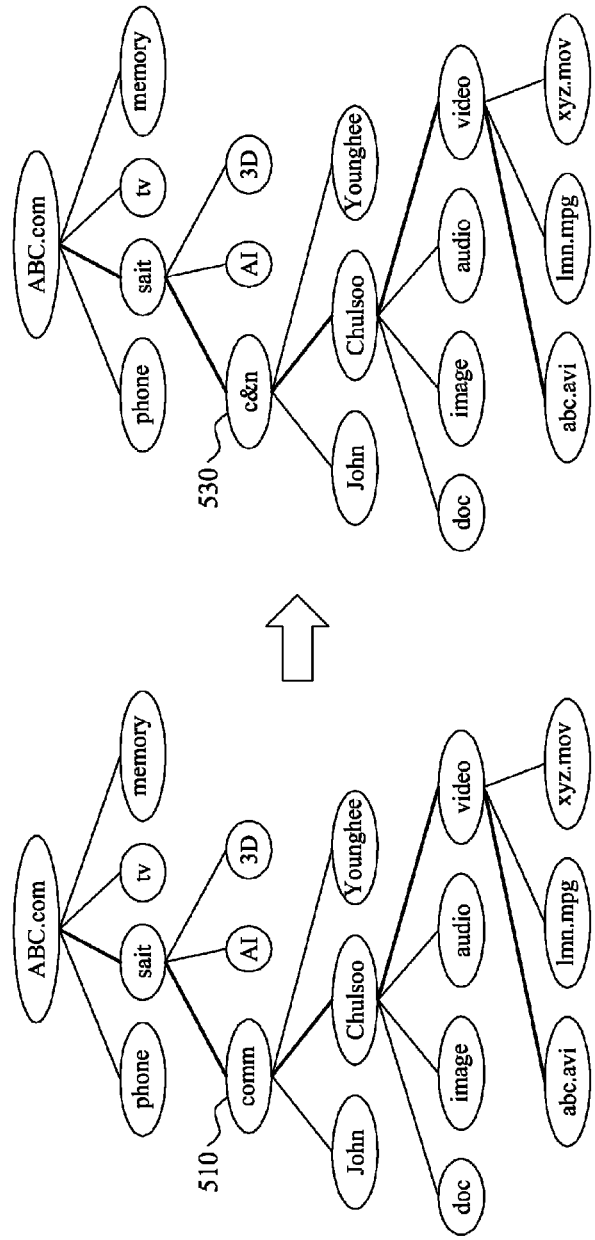
FIG. 5 is a diagram illustrating an example in which a hierarchical name structure of content is changed in a CCN.

FIG. 5 illustrates an example in which a hierarchical name structure of content is changed in a CCN. In the conventional CCN, to search in a content cache or a PIT of a node for an entry associated with a content name in a content-request packet, the node determines whether a full name of content that is stored in the content cache or the PIT is identical to the content name. To search in a FIB of a node for an entry associated with the content name, the node determines whether a prefix of a full name of content that is stored in the FIB is identical to a prefix of the content name. However, when a portion of the content name is changed, the above name comparison scheme may preclude a possibility of an access to content generated prior to the change in the content name based on an original name of the content.

For example, in FIG. 5, a name of a department to which a user (e.g., Chulsoo) belongs, is changed from comm 510 to c&n 530, that is, an intermediate portion of a hierarchical content name is changed. In this example, since nodes, participating in networking, update an FIB, a content-request packet including an original content name may not be transferred to a corresponding node.

Additionally, a content-request packet including a content name based on the changed name of the department (e.g., '/ABC.com/sait/c&n/Chulsoo/video/abc.avi') may be transferred to a node. However, as illustrated in FIG. 4, the node may use the original content name (e.g., 'ABC.com/sait/comm/Chulsoo/video/abc.avi') to find content, and accordingly, the content (e.g., 'abc.avi') may not be found.

Figure 6:
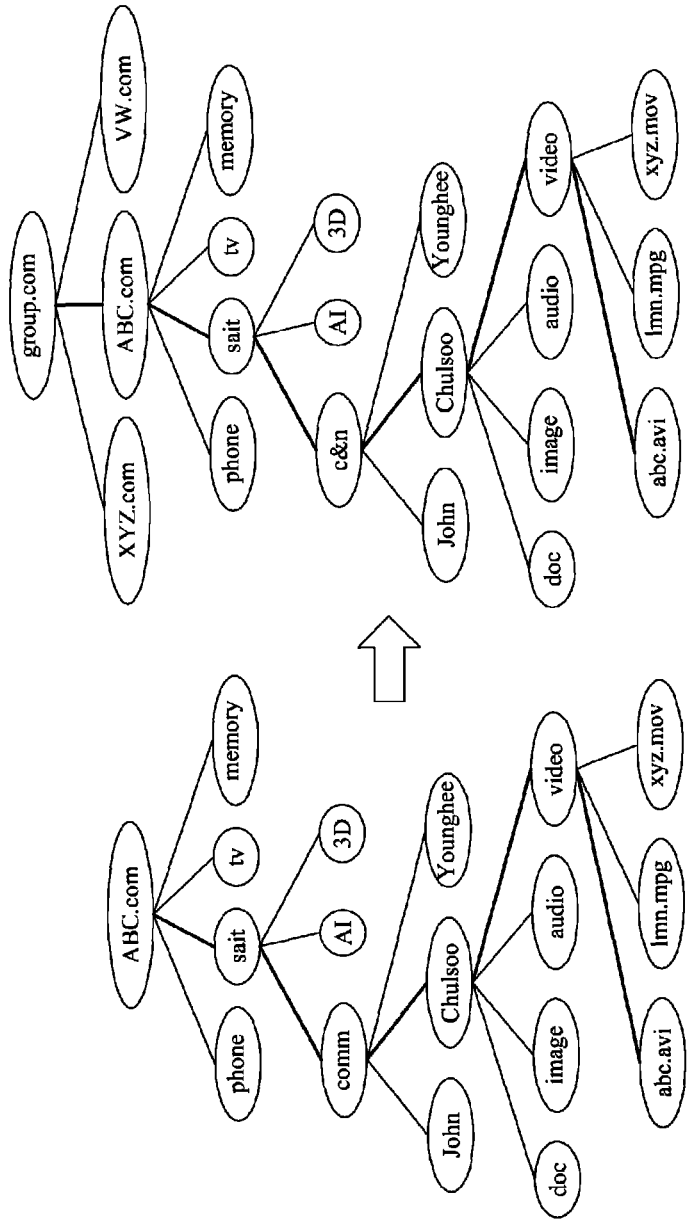
FIG. 6 is a diagram illustrating an example in which a hierarchical name structure of content is expanded in a CCN.
Figure 7:
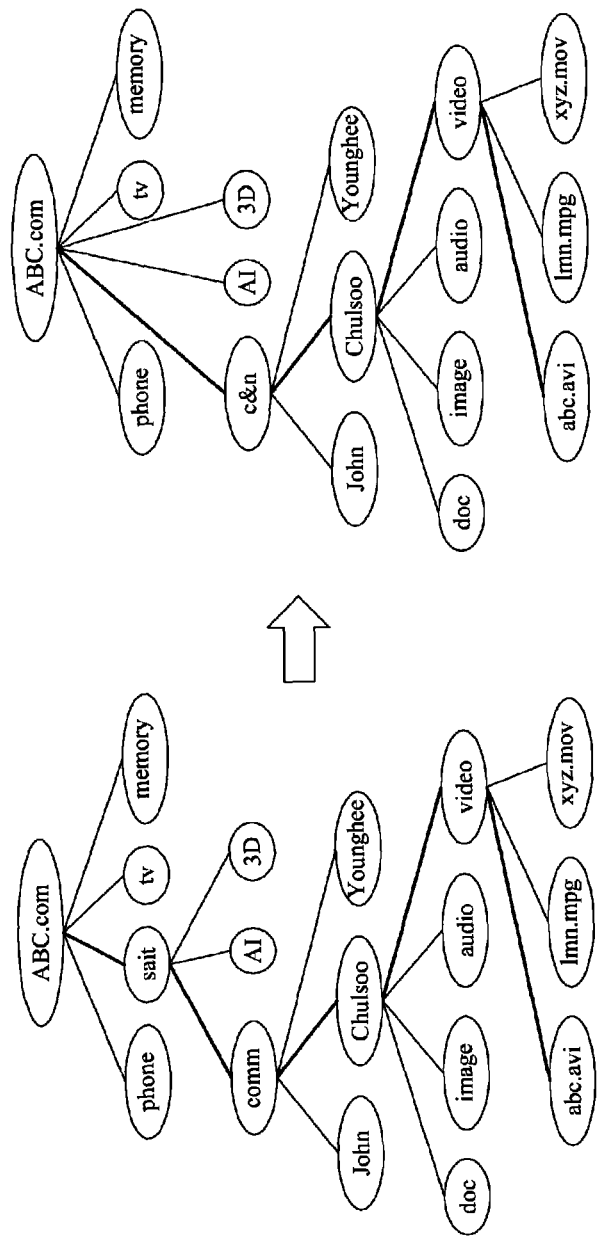
FIG. 7 is a diagram illustrating an example in which a hierarchical name structure of content is reduced in a CCN.

FIG. 6 illustrates an example in which a hierarchical name structure of content is expanded in a CCN. FIG. 7 illustrates an example in which a hierarchical name structure of content is reduced in a CCN. Referring to FIG. 6, a name of an upper node (e.g., 'group.com') is added to the hierarchical name structure of FIG. 5. Referring to FIG. 7, an intermediate node (e.g., 'sait') is deleted from the hierarchical name structure of FIG. 5, so that nodes (e.g., 'AI' and '3D') under the deleted intermediate node are located directly below an upper node (e.g., 'ABC.com') of the deleted intermediate node.

The examples of FIGS. 5 through 7 may be situations that frequently occur. It is possible to minimize a problem caused by a change in a name of a node, even in the above situations.

To provide content generated prior to a change in a content name, to nodes that request the content, a content generation node may use a shortened name of the content based on a position of the content in a node, instead of using a full name of the content based on a hierarchical name structure. For example, the content generation node may use the shortened name '/video/abc.avi', instead of the full name '/ABC.com/sait/comm/Chulsoo/video/abc.avi'.

Accordingly, in association with a content-request packet including an original content name or a changed content name (e.g., /ABC.com/sait/c&n/Chulsoo/video/abc.avi), postfix matching may be used, which includes determining whether an end portion of a content name included in the content-request packet is identical to a content name included in a node. Postfix matching may be used instead of comparing and matching full content names. The end portion of the content name may include, for example, a postfix of the content name from which the fourth class of FIG. 1 is excluded. A name unused in comparison may be required to transmit a content-request packet, but may not include great significance in comparison of names in a content generation node.

Additionally, to fetch content generated in a group (e.g., a communication (comm) group) from the same group, a beginning portion of a hierarchical name of the content that represents the group (e.g., '/ABC.com/sait/comm/') may not include great significance in transmission of a content-request packet. Thus, a content name shortened based on a communication range may be used, instead of a full hierarchical name of content that is given when the content is generated.

Accordingly, a content name in a content-request packet transferred from an outside of a group may need to be changed, as a group range is narrowed. Hereinafter, an example of a method of changing a content name of a content-request packet transferred from an outside in a network structure based on movement of nodes, will be described with reference to FIGS. 8 and 9.

Figure 8:
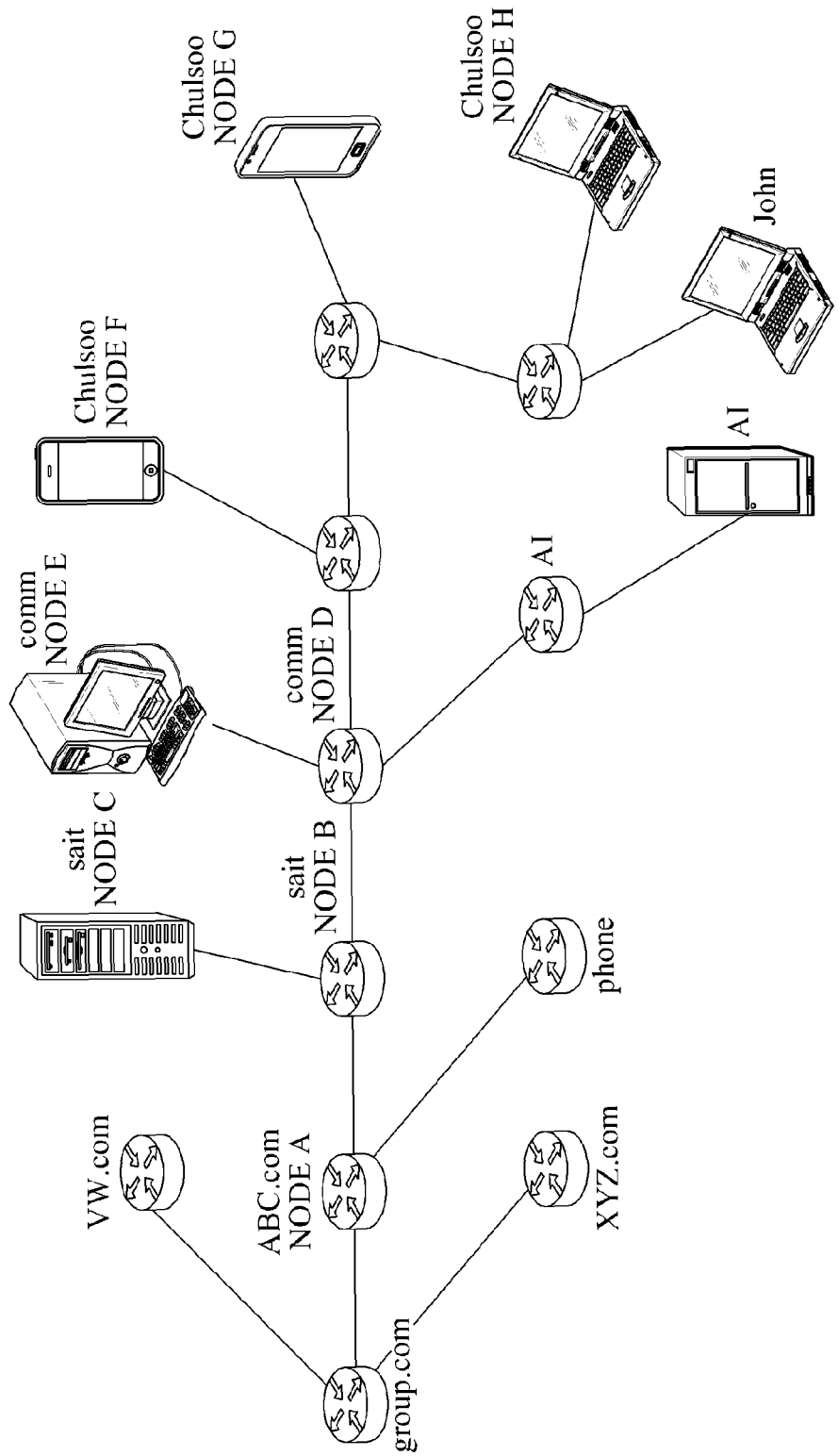
FIG. 8 is a diagram illustrating an example of a relationship between a hierarchical name of content and nodes included in a CCN.

FIG. 8 illustrates an example of a relationship between a hierarchical name of content and nodes included in a CCN. In a name-based network, a name component of content may not correspond to a single node.

In FIG. 8, a node A represents 'ABC.com', and nodes B and C represent 'sait'. Additionally, nodes D and E represent 'comm', and nodes F, G, and H represent 'Chulsoo'. A plurality of nodes may represent a single name component, or a single node may represent a plurality of name components. For example, a single node may represent 'ABC.com' and 'sait', or may represent 'Chulsoo' or 'John'. In addition, a node between the nodes B and D may be irrelevant to a name component of content.

When a node represents a name component, a content-request packet may be processed using a content name without including department information, which may include the same result as if a full content name is used. For example, when a name component corresponding to a department name is changed as illustrated in FIG. 5, a content name (e.g., '/Chulsoo/video/abc.avi') that does not include department information (e.g., '/ABC.com/sait/comm' or '/ABC.com/sait/c&n') may be used between people belonging to the same department (e.g., Chulsoo, John, or Younghee). In this example, when a networking module of each node supports use of the content name that does not include the department information, the same result as if the full name of content is used may be achieved. As described above, a communication between users in a department may not be affected, despite a name component with a large scale being added before a department name component as illustrated in FIG. 6, or despite a name component for an upper department being deleted as illustrated in FIG. 7.

Additionally, similar operations may be performed when a communication between users in a hierarchical name structure is performed, or when an upper organization of a department is changed. For example, when departments below a name component 'sait' are connected directly to 'ABC.com', as illustrated in FIG. 7, nodes in a department 'AI' or '3D' may not need to recognize that the name component 'sait' disappears, to fetch content of a user in a department 'comm'.

However, to fetch content in a changed portion of a hierarchical name from the outside, a content-request packet may need to be written based on a new name, in the same manner as a conventional scheme. For example, when a department name is changed from 'comm' to 'c&n' as illustrated in FIG. 5, users in a department 'c&n' may use a content name started from a user's name (e.g., '/Chulsoo/video/abc.avi'), as usual. In this example, users in other departments (e.g., 'AI', '3D') in 'sait' may use a content name including the changed department name (e.g., '/c&n/Chulsoo/video/abc.avi'). Additionally, a user, who belongs to 'ABC.com' but belongs to departments other than the department 'sait', may need to use a content name including 'sait' (e.g., '/sait/c&n/Chulsoo/video/abc.avi'). A user who does not belong to 'ABC.com' may need to use a full name of content (e.g., '/ABC.com/sait/c&n/Chulsoo/video/abc.avi').

Figure 9:
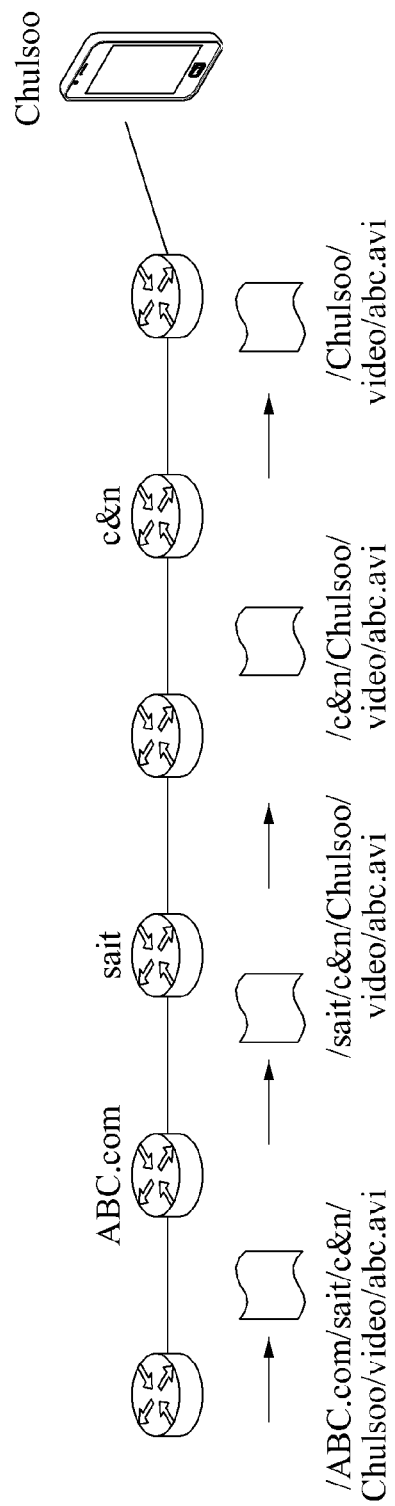
FIG. 9 is a diagram illustrating an example of a method of changing a content name in a content-request packet in a CCN, when the content-request packet passes through intermediate nodes included in the CCN.

FIG. 9 is a diagram illustrating an example of a method of changing a content name in a content-request packet in a CCN, when the content-request packet passes through intermediate nodes included in the CCN. To prevent a name of an upper node from being used in communication within a group, an intermediate node configured to transmit the content-request packet, or a node configured to store content, may need to remove a beginning portion (e.g., a prefix) of the content name that is not required to perform internal communication or searching for the content.

Referring to FIG. 9, for example, when a content-request packet including a content name '/ABC.com/sait/c&n/Chulsoo/video/abc.avi' passes through each intermediate node, each intermediate node changes the content name based on a name assigned to each intermediate node, namely, a name component corresponding to each intermediate node. For example, when the content-request packet passes through an intermediate node that controls 'ABC.com', the node changes the content name to '/sait/c&n/Chulsoo/video/abc.avi'. When the content-request packet passes through an intermediate node that controls 'sait', the node changes the content name to '/c&n/Chulsoo/video/abc.avi'. When the content-request packet passes through an intermediate node that controls 'c&n', the node changes the content name to '/Chulsoo/video/abc.avi'.

In other words, each intermediate node determines whether a name prefix of the content name in the content-request packet is identical to a name component corresponding to an intermediate node. When the name prefix is determined to be identical to the name component, each intermediate node removes the name prefix from the content name. Subsequently, each intermediate node uses the changed content name, namely a shortened name, to compare with content names in a corresponding intermediate node, and/or to transmit the content to a lower node.

The above method may be performed to a last node, for example, a node that controls 'Chulsoo'. For example, when the content-request packet enters the last node, the last node changes the content name (e.g., '/Chulsoo/video/abc.avi') to a shortened name (e.g., '/video/abc.avi'), and searches for a corresponding file in a terminal of the last node.

Figure 10:
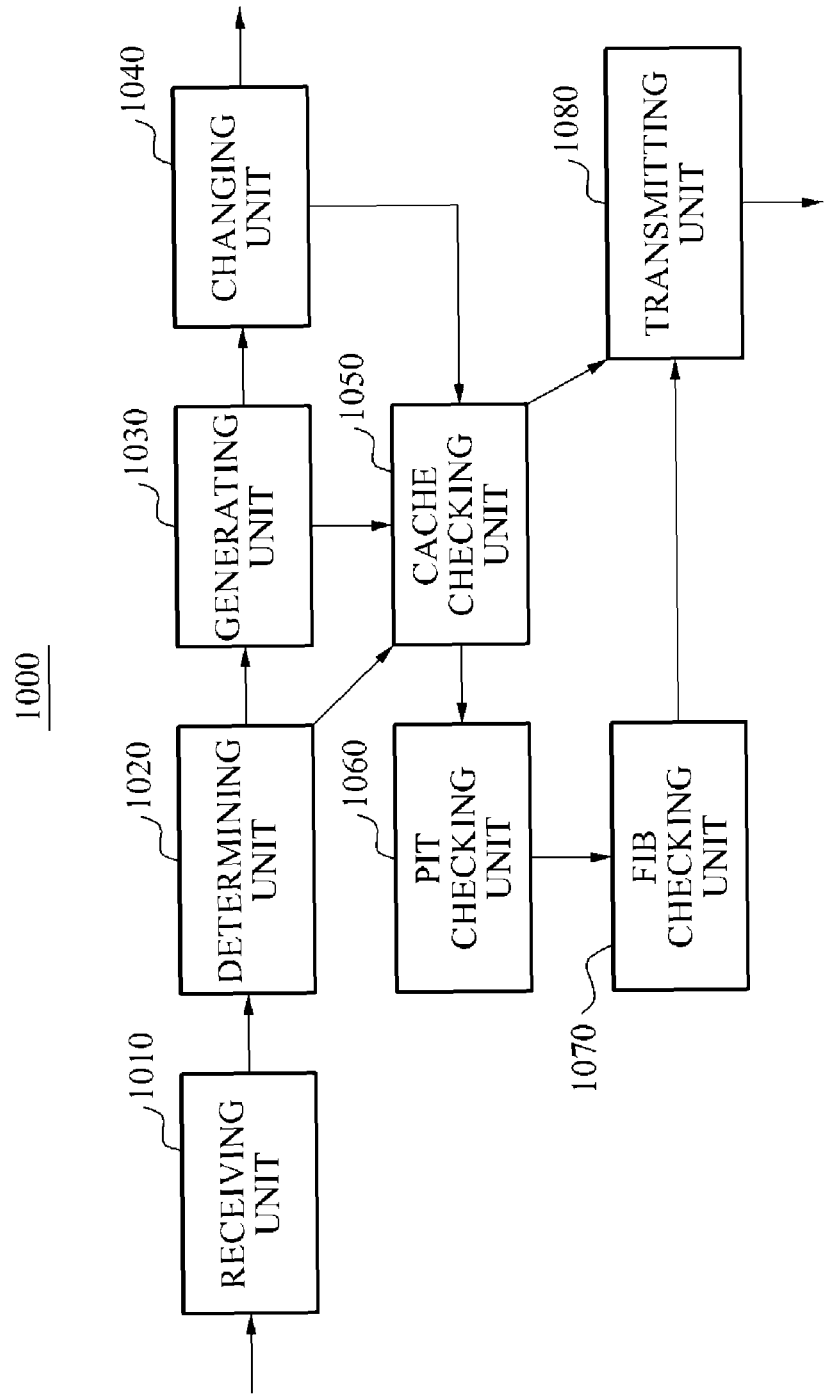
FIG. 10 is a block diagram illustrating an example of a node included in a CCN.

FIG. 10 illustrates an example of a node 1000 included in a CCN. Referring to FIG. 10, the node 1000 included in the CCN based on a hierarchical name structure includes a receiving unit 1010, a determining unit 1020, a generating unit 1030, and a changing unit 1040. The node 1000 further includes a cache checking unit 1050, a PIT checking unit 1060, a FIB checking unit 1070, and a transmitting unit 1080.

The receiving unit 1010 receives, from, e.g., another node included in the CCN, a content-request packet that requests content and includes a hierarchical name of the content.

The first determining unit 1020 determines whether a prefix of the hierarchical name of the content is identical to a name component corresponding to the node 1000.

The generating unit 1030 generates a shortened name by removing the prefix from the hierarchical name of the content based on a determination result of the first determining unit 1020.

The changing unit 1040 changes the hierarchical name of the content to the shortened name.

The cache checking unit 1050 verifies whether the content is stored in the content cache of the node 1000 based on the hierarchical name of the content (e.g., the shortened name), based on a determination result of the determining unit 1020.

The PIT checking unit 1060 determines whether the PIT includes an entry including the same hierarchical name of the content (e.g., the shortened name) based on a result of the cache checking unit 1050.

The FIB checking unit 1070 searches for an entry in the FIB based on the hierarchical name of the content (e.g., the shortened name), based on a result of the PIT checking unit 1060.

The transmitting unit 1080 transmits, to the node that sent the content-request packet, a data packet when the name of content in the content cache is matched with the shortened name, based on the result of the cache checking unit 1050. The transmitting unit 1080 further transmits, to, e.g., another node included in the CCN, the content-request packet, based on a result of the FIB checking unit 1070.

According to the teachings above, there is provided a method of changing a hierarchical name of content included in a content-request packet to a shortened name based on a name component corresponding to a node in a CCN. Thus, it is possible to reduce a sensitivity of nodes to a change in a content name. Additionally, it is possible to reduce a time to search for a related entry in a node, and to reduce memory space or storage space required to store a content name.

The units described herein may be implemented using hardware components, software components, or a combination thereof. For example, the hardware components may include processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, that independently or collectively instructs or configures the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, and optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

As a non-exhaustive illustration only, a terminal described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of a node included in a content-centric network (CCN) based on a hierarchical name structure, the method comprising:
   receiving a packet requesting content comprising a hierarchical name of the content;
   determining whether a prefix of the hierarchical name is identical to a name of the node;
   generating a shortened name by removing the prefix from the hierarchical name when the prefix is identical to the name of the node; and
   changing the hierarchical name to the shortened name.

2. The method of claim 1, further comprising:
   using the shortened name of the content that is stored in a content cache of the node instead of the full hierarchical name of the content.

3. The method of claim 1, further comprising:
   verifying whether the content is stored in a content cache of the node based on the shortened name.

4. The method of claim 3, further comprising:
   determining whether a pending interest table (PIT) of the node comprises an entry comprising the shortened name if the content is not stored in the content cache.

5. The method of claim 4, further comprising:
   determining whether a forwarding information base (FIB) of the node comprises an entry based on the shortened name if the PIT does not comprise the entry comprising the shortened name.

6. The method of claim 5, further comprising:
   transmitting the packet if the FIB comprises the entry based on the shortened name.

7. The method of claim 4, further comprising:
   adding information on an interface of the node that receives the packet to the entry if the PIT comprises the entry.

8. The method of claim 1, further comprising:
   using the shortened names in a pending interest table (PIT) of the node instead of the full hierarchical names.

9. The method of claim 1, further comprising:
   using the shortened names in a forwarding information base (FIB) of the node instead of the full hierarchical names.

10. A non-transitory computer readable storage medium storing a program comprising instructions to cause a computer to implement the method of claim 1.

11. A node included in a content-centric network (CCN) based on a hierarchical name structure, the node comprising:
    a receiving unit configured to receive a packet requesting content comprising a hierarchical name of the content;
    a determining unit configured to determine whether a prefix of the hierarchical name is identical to a name of the node;
    a generating unit configured to generate a shortened name by removing the prefix from the hierarchical name when the prefix is identical to the name of the node; and a changing unit configured to change the hierarchical name to the shortened name.

12. The node of claim 11, further comprising:

a content cache configured to store the hierarchical name of the content, wherein the content cache indexes content with the shortened names instead of the full hierarchical names.

13. The node of claim 11, further comprising:

a content cache; and a cache checking unit configured to verify whether the content is stored in the content cache based on the shortened name.

14. The node of claim 13, further comprising:

a pending interest table (PIT); and a PIT checking unit configured to determine whether the PIT comprises an entry comprising the shortened name if the content is not stored in the content cache.

15. The node of claim 14, further comprising:

a forwarding information base (FIB); and a FIB checking unit configured to determine whether the FIB comprises an entry based on the shortened name if the PIT does not comprise the entry comprising the shortened name.

16. The node of claim 15, further comprising:

a transmitting unit configured to transmit the packet if the FIB comprises the entry based on the shortened name.

17. The node of claim 14, wherein the node is configured to add information on an interface of the node that receives the packet to the entry if the PIT comprises the entry.

18. The node of claim 11, further comprising:

a pending interest table (PIT) configured to store the hierarchical name of the content, wherein the PIT indexes entries with the shortened names instead of the full hierarchical names.

19. The node of claim 11, further comprising:

a forwarding information base (FIB) configured to register information, wherein FIB indexes entries with the shortened names instead of the full hierarchical names.

* * * * *